United States Patent [19]

Kotliar et al.

[11] Patent Number: 5,912,062
[45] Date of Patent: Jun. 15, 1999

[54] UTILIZATION OF WASTE FIBERS IN LAMINATES

[75] Inventors: Abraham M. Kotliar, Athens; Stephen Michielsen, Lawrenceville, both of Ga.

[73] Assignee: Georgia Tech Research Corporation, Atlanta, Ga.

[21] Appl. No.: 08/786,556

[22] Filed: Jan. 21, 1997

Related U.S. Application Data

[60] Provisional application No. 60/010,623, Jan. 26, 1996.

[51] Int. Cl.$^6$ .................................. B32B 3/24; B32B 5/08
[52] U.S. Cl. .......................... 428/140; 428/137; 428/138; 428/139; 428/300.7; 428/301.4; 428/297.4; 428/903.3; 428/86; 428/96; 442/252; 442/251; 442/253; 442/263; 442/281; 156/87; 156/308.2; 156/311; 156/276; 156/330; 156/335
[58] Field of Search ..................................... 428/137, 138, 428/139, 140, 300.7, 301.4, 297.4, 903.3, 86, 96; 442/251, 252, 253, 263, 281; 156/87, 308.2, 311, 276, 330, 335

[56] References Cited

U.S. PATENT DOCUMENTS

| | | | |
|---|---|---|---|
| 4,229,473 | 10/1980 | Elber | 428/113 |
| 4,234,366 | 11/1980 | Brewer et al. | 156/79 |
| 5,217,655 | 6/1993 | Schmidt | 264/22 |
| 5,240,530 | 8/1993 | Fink | 156/94 |
| 5,288,349 | 2/1994 | Fink et al. | 156/72 |
| 5,294,384 | 3/1994 | David et al. | 264/37 |
| 5,444,113 | 8/1995 | Sinclair et al. | 524/306 |
| 5,470,648 | 11/1995 | Pearlman et al. | 428/247 |
| 5,472,763 | 12/1995 | Schwarz et al. | 428/95 |
| 5,518,188 | 5/1996 | Sharer | 241/14 |
| 5,598,980 | 2/1997 | Dilly-Louis et al. | 241/20 |
| 5,626,939 | 5/1997 | Kotlair et al. | 428/97 |
| 5,637,375 | 6/1997 | Hohman | 428/113 |
| 5,658,430 | 8/1997 | Drake, Jr. et al. | 428/86 |
| 5,704,104 | 1/1998 | Bacon et al. | 28/299 |

*Primary Examiner*—William P. Watkins, III
*Attorney, Agent, or Firm*—Oldham & Oldham Co., L.P.A.

[57] ABSTRACT

The present invention provides compositions and processes wherein recycling of waste carpets and textiles is achieved by coating the individual yarn fibers with a low viscosity adhesive that is dispersed or dissolved in a suitable solvent to affect coverage of the fine fibers, and arranging the coated fibers in layers to affect the most desirable physical properties and then cured to provide a high modulus matrix for the coated fibers in the laminate structure. The fibers may be from unshredded or shredded waste carpets, shredded waste woven or non woven fabrics, fabric bits, and knitted fabrics. When the carpet is used in an as received condition, the face yarns, which may contain one or more components yarns, are coated and the carpets are arranged in a sandwich construction wherein the backings of the two carpets are placed back-to-back, e.g., $(F-B-(B-F)_n-B-F$, (n=0 or an integer value, F=face yarn and B=backing) and then heated under applied pressure to affect a cure of the resin coating and the adhesion between carpet backing layers. The resulting laminate consists of two outer fibrous layers that contains the unmelted yarns bundles from the carpet in a high modulus matrix.

40 Claims, No Drawings

UTILIZATION OF WASTE FIBERS IN LAMINATES

This application claims the benefit of U.S. Provisional Application No. 60/010,623, filed Jan. 26, 1996.

TECHNICAL FIELD

The present invention is directed to compositions and methods for producing laminates from waste carpets and waste textiles containing unmelted synthetic and natural fibers. The fibrous components of the waste carpet face yarn and/or waste textiles are coated with a low viscosity adhesive which is then cured to a high modulus fibrous laminate material by the application of heat and pressure. More specifically, the present invention is directed to compositions and methods for making a laminate that utilizes the strength of the unmelted individual face yarn fibers of waste carpets and shredded textiles or textile pieces to make plastic laminates which can be used as a synthetic wood and other articles of commerce.

BACKGROUND OF THE INVENTION

Limited landfill capacity and an increase in the environmental awareness and government regulations have spurred efforts for the recycling of post-consumer and post-industrial, synthetic and natural polymeric material. About 6 billion pounds of carpets are produced annually in the United States which start showing up as waste in landfills after about seven years. Currently there are about 8 billion pounds of waste carpets and fabrics that are land filled per year. Waste fabrics and carpet constitute a very serious environmental issue and a very significant financial cost to the manufacturer and consumer.

Typical conventional carpeting includes three primary components: (1) a face yarn that generally consists of nylon 6 or nylon 6,6 fibers with smaller amounts of polyester, polypropylene, acrylics, wool and cotton fibers; (2) a carpet backing that is generally made of polypropylene fibers with a much smaller amount of jute fibers; and (3) an adhesive material that is usually styrene- butadiene rubber and is applied as a latex and cured after application. The adhesive is usually filled with a very high melting inorganic material such as calcium carbonate. These typical carpet constructions are well known in the art and are exemplified in U.S. Pat. No. 4,643,930. Because of the diverse chemical structure of the melt incompatible fiber components of waste carpet, an economical recycling of this material presents a particularly difficult technological challenge.

Waste textiles often consists of blends of fibers having different compositions, yarns containing different fiber types, deniers and colors. This makes reuse and/or separation into individual fiber components difficult. As with waste carpet fibers, melt blending of the synthetic fibers yield melt incompatible materials which have little value.

Previous efforts for disposing of waste fibers by individuals and corporations have relied on burning the waste fibrous materials in massive incinerators, shredding the carpets and/or fabrics and separating the fibers by their density followed by depolymerization to recover the monomers of the polyamides or polyester material, use of supercritical fluids to dissolve the fibers followed by precipitation, and melt extruding the unseparated carpet components into a polyblend composite, which is described in U.S. Pat. No. 5,294,384. The above processes have not been satisfactory from at least one of environmental or economic or technical aspects. Additionally, melt extruded polyblends have particularly weak interfacial adhesion between the incompatible blend components and do not produce a very satisfactory product. Copending and commonly assigned patent application Ser. No. 08/523,257, now U.S. Pat. No. 5,626,939, issued May 6, 1997, coats the shredded waste carpet fibers and fabrics with a structural adhesive and is cured below the melting point of the face yarn.

SUMMARY OF THE INVENTION

The present invention provides compositions and processes wherein recycling of waste carpets and textiles is achieved by coating the individual yarn fibers with a low viscosity adhesive that is dispersed or dissolved in a suitable solvent to affect coverage of the fine fibers, and arranging the coated fibers in layers to affect the most desirable physical properties and then cured to provide a high modulus matrix for the coated fibers in the laminate structure. The fibers may be from unshredded or shredded waste carpets, shredded waste woven or non woven fabrics, fabric bits, and knitted fabrics. When the carpet is used in an as received condition, the face yarns, which may contain one or more components yarns, are coated and the carpets are arranged in a sandwich construction wherein the backings of the two carpets are placed back-to-back, e.g., (F-B-(B-F)$_n$-B-F, (n=0 or an integer value, F=face yarn and B=backing) and then heated under applied pressure to affect a cure of the resin coating and the adhesion between carpet backing layers. The resulting laminate consists of two outer fibrous layers that contains the unmelted yarns bundles from the carpet in a high modulus matrix. Additional outer layers may be added to the laminate with carpet layers or through the addition of coated shredded waste fibers to the two outer laminate layers. Because the carpet face yarn is not very strongly bonded to the carpet backing, it is advantageous to make small holes in the carpet backing so that the applied adhesive on the face yarn can form protrusions into the backing thereby strongly anchoring the matrix to the backing.

The laminate construction may be also arranged so that the backing is on the outside and the two coated face yarns are placed face-to-face (B-F-F-B). With this arrangement the curing of the inner fibrous layers can be carried out at fabrics temperatures below the melting point of the polypropylene backing. When the backing is not a material that melts below 200° C., e.g., a natural fiber such as jute, both the face yarn and the backing material are coated with an adhesive and cured under pressures of about 500 p.s.i. and at lower temperatures, preferably above the boiling point of water. A large number of arrangements of multiple layers can be made, but it is best to always place backing to backing and face yarn to face yarn to achieve the strongest interfacial adhesion between layers. Whenever backing to backing layers are used, the cure must be carried out above the melting point of the polyolefin backing. When shredded waste carpet fibers are used as the core, the adhesion between layers of the laminate is very good and the mechanical interlocking provided by the matrix resin protrusions are not necessary. Multiple layers of carpet can be stacked to increase the thickness of the laminate.

It may be desirable to shred the waste carpet to make master batches of the waste fibers because waste carpets come in a number of different thickness, sizes and compositions. These fibers, to which other waste fibers may be added, are then coated with the matrix forming adhesive to form the core layer of the laminate. Coated waste fibers can then be added to one or both surfaces to form the outer layer or layers of the laminate. The curing of the laminate is carried out above the boiling point of water and preferably above the melting point of polyolefin of the carpet backing.

The cured laminate can be used as a wood substitute in applications such as sub-flooring, roofing materials, house siding, strand board, supports for outdoor signs, railings, and in outdoor applications where wood and metal are currently used in transportation and road construction applications.

DETAILED DESCRIPTION OF THE PREFERRED EMBODIMENT

The compositions and processes of the present invention are useful for converting shredded or unshredded waste carpet into plastic laminates. When unshredded carpet is used, one may also add waste fabric pieces, e.g., shredded waste fabrics and knits, surface films and shredded waste plastics to the layers of the laminates. The criteria for adding material to the carpet face yarn is that the material strongly bonds to the matrix adhesive of the type listed in Table 2 and improves the properties of the laminate. Adding material to the unshredded carpet backing is limited to materials that are compatible with polypropylene, with or without additives, or do not adversely affect the adhesion of the backing to another carpet backing. A blowing agent may be added to the interior laminate layers to increase the overall laminate thickness and reduce the density of the laminate. It is also advantageous to make small holes in the carpet backing so that the applied adhesive on the face yarn can form protrusions into the backing thereby strongly anchoring the matrix to the backing. When the backing is not propylene but a natural fiber such as jute or a synthetic fiber other than polypropylene, the backing must also be coated with an adhesive of the type listed in Table 2. With these latter type backings, holes in the carpet backing to form protrusions of adhesive may not be necessary. The level of coating for the outer layers of the laminate can range from 5 to 50 weight percent, preferably from 20 to 35 weight percent. Similarly the core can be coated from 5 to 50 weight percent when non-polypropylene fibers are present. The amount of adhesive and the type of adhesive need not be the same in each layer of the laminate. The pressure on molding can range from 100 to 1000 p.s.i., preferably from 300 to 600 p.s.i.

The first step in the process when using unshredded carpet is to coat the face yarn of at least one carpet, which can be of the commercial or residential type, with a low viscosity adhesive selected from Table 2 that can be cured to a high modulus matrix. Table 1 lists the range of component compositions that one normally encounters with carpets. The face yarns are generally nylons, polyesters, polyolefins, acrylics, wool and cotton.

TABLE 1

| | |
|---|---|
| Face Yarn | 15 to 70% |
| Polyolefin | 5 to 35% |
| Latex (SBR) | 5 to 30% |
| Inorganic Filler | 10 to 30% |

It is also advantageous to introduce into the carpet a grid of holes so that the matrix adhesive can form protrusions into the backing to increase the flexural modulus and strength of the laminate. These can form by flow of the adhesive during the molding cycle or can be injected during the hole forming step. The hole size in the carpet should be large enough for the adhesive to flow into the matrix. With an injection system the holes can be quite small, e.g., 0.080 inches. When the adhesive is only applied to the face yarn, the size depends on the amount of adhesive applied and the viscosity of the adhesive. A hole size of 0.12 inches is generally satisfactory. These holes can be spaced on a grid 0.5 to 1 inch apart. Larger hole place placement does not show as large a reinforcement. Smaller distances than 0.5 inches for laminates about 0.25 inches thick do not appear to improve the flexural properties with 0.25 inch thick laminates using a three point bending fixture with a four inch span (ASTM 790). One skilled in the technology would expect that a balance in impact strength and flexural modulus would govern the amount of protrusions that are selected for a given application.

The structure of the laminate can be a single layer of carpet, or contain multiple layers of (F-B-B-F), (F-B-(B)$_n$-B -F), (F-B-(B-F-F-B)$_n$-B-F), or (F-B-(B-F-F-B)$_n$) where F and B refer to the face yarn and backing layer respectively, and n is zero or a positive integer. Laminates with the backing on the outer surface can also be made of the type (B-F-F-B), and (B-F-(F-B-B-F)$_n$-F-B). For maximum panel stiffness, it is best to have the higher modulus layers on the outside surfaces, e.g., (F-B-(B)$_n$-B-F) or (F-B-(B-F-F-B)$_n$-B-F). Multiple layers of the waste carpet backing can be obtained by shearing the face yarn from the carpet and recovering the face yarn for other applications. It is however useful to have protrusions of the adhesive present at all F-B layers to anchor the two layers which significantly improves the interfacial shear strength. An additional outer skin may be added to one or both surfaces to provide specific surfaces for the laminate. It is often advantageous to add coated waste fabric fibers and bits to the outer laminate layers to increase the overall laminate thickness and increase the flexural modulus and strength of the laminate. The presence of nonbinding polypropylene in the outer layers of the laminate is preferably avoided because their presence will reduce the flexural modulus and strength of the laminate.

The waste carpets as well as other components used may be washed to remove unwanted trash. These washed materials need not be dried. Removal of the surface water is however desirable.

The second step in the process is to cure the low viscosity adhesive coating to a high modulus matrix. The curing temperature of the laminate depends on the geometry, backing component of the carpet and the type of adhesive used. With the polypropylene in the interior of the laminate, temperatures above 170° C. are necessary to affect the fusion of the polypropylene layers. At temperatures above about 205° C., most adhesives that cure to a high modulus show significant amounts of decomposition and these high temperatures should be avoided. Pressures of 500 p.s.i. have proved to be satisfactory with lower molding pressures usually decreasing the physical properties. Because of the water present, it is desirable to affect a release near the end of the cure cycle. Spacers, molds or frames may be used to limit the amount of flow of the polypropylene. These spacers, frames and molds are so sized that the transfer of the pressure onto the spacers occurs near the end of the cycle. This allows for the gradual release of water and other volatile components. Otherwise blowouts may occur. A press that has a control of the applied pressure is an advantage to the process particularly when the backing is made of a natural fiber such as jute or a synthetic fiber that does not melt below 200° C. in order to allow for the release of volatile material, in particular water. For carpets that yield a 0.25 inch thick laminate, a temperature of 195° C. and a press time of 18 minutes is satisfactory for fusion of the backing layers or the shredded coated fibrous core and the curing of the adhesives listed in Table 2. The coated fibrous waste of the face yarn layer need not have a preferred fiber composition, e.g., specific amounts of polyester, cotton, nylon, polypropylene and the like. The important factor is the total weight fraction of fibers in each of the layers that strongly bond to the matrix adhesive and the type and amount of adhesive used. A special class of laminates that have core structures (F-B) and (B-F-F-B) can be molded at lower temperatures. It is desirable to have the cure temperature above the boiling point of water to affect its release. A temperature of 120° C. is satisfactory. Lower cure temperatures can be used with non water based adhesives. The weight fraction of the adhesive in the outer laminate layers should be in the 5 to 70 weight percent range and preferably in the 20 to 35 weight percent range.

The core need not contain unshredded carpets. It may be desirable to shred the carpet and blend the shredded carpets from many sources to a desired fiber composition. One may also add matrix binding fibers, fabric bits or sheets, films and the like to both inner or outer layers of the laminate. When the core contains shredded fibrous waste that is coated with the high modulus forming matrix adhesive, the core will strongly adhere to the outer layers of the laminate and a process of forming holes in the core layer may not be necessary. The outer layers of the laminate are then formed by adding a coated layer of matrix bonding fibers. The matrix forming coating of the outer layers of the laminate need not be the same weight fraction or type of the coating of the core providing they coatings show good adhesion to each other. Because the outer layers of the laminate contribute most of the stiffness and strength of the laminate, it is useful to have higher loadings of the matrix forming coating in the outer layers. The weight fraction of the adhesive in the core can be in the 5 to 50 weight percent and preferably in the 10 to 20 weight percent range. The weight fraction of the adhesive in the outer layers can be in the 5 to 70 percent range and preferably in the 20 to 35 percent range.

The coating can be carried out with a device that sprays, dips, rolls and the like. Although it is preferable for the coating resin be dispersed or dissolved in a liquid, powdered resins that melt to a sufficiently low viscosity to completely coat the fibers during processing may be used. The melting or fluidity point of the resin should be below the temperature where significant curing of the resin occurs.

The resins used as high modulus adhesives that are initially low viscosity prepolymers such as but not limited to the adhesives listed in Table 2.

TABLE 2

LIST OF ADHESIVES THAT CAN BE CURED TO A HIGH MODULUS MATRIX

Phenol - formaldehyde resins, either of the resole or novalac type.

1. Phenol - formaldehyde resins that may have other co-monomers present, such as bis-phenol A, resorcinol, and other substituted phenols.
2. Urea - formaldehyde resins.
3. Melamine urea formaldehyde resins.
4. Tannin - phenol - formaldehyde resins.
5. Diisocyanate resin.
6. Epoxy resins.
7. Crosslinkable polyvinyl acetate.
8. Protein type such as soy flour, blood etc.
9. Curable polyester resins.

Those skilled in the art can readily formulate the phenol formaldehyde resins to contain various ratios of phenol to formaldehyde, co-monomers such as bisphenol, resorcinol and other substituted phenols to enhance particular properties of the resin such as modulus, strength, water repellence and curing rates and curing temperatures. Catalysts such as tolunesulfonic acid and latent catalysts such as ammonium sulfate can be added to increase the rate of curing. Similarly the other resin types listed can be modified to achieve desired characteristics, but are still considered to belong to one of the above general groups. The above general types of resins are commercially available from a number of commercial sources and these commercial sources may provide their proprietary compositions to help meet the desired characteristics of the composite. The above general resin types may be catalyzed, mixed with one another, contain wetting agents, flame retarders, water repellents, and water soluble thickening to enhance tack in the pre-pressing when the composites are made by molding. Because the thickness of these fibers is very small, generally about 50 to 70 microns, the viscosity of the coating solution should be in the sprayable range and preferably in a water or water alcohol mixture. Viscosities of below 100 poise are generally satisfactory.

The composition of waste carpets, knits, and fabrics is broad and is generally not completely known. We have used the following analysis to determine the contents of the material used in the laminate.

1. The determination of the water soluble dirt content of carpet or fabric waste:
   (a) Weigh out 5 grams of waste fiber;
   (b) Wash in about 300 ml of water for 5 minutes; and
   (c) Filter solution and the dry residue.
      The difference between the dry initial and final weights can be considered the water soluble dirt. Note the filler content of the latex, which is usually $CaCO_3$, is essentially insoluble in water and is not considered "dirt". It will always be present as a dust in shredded carpets.

2. The determination of the oil soluble dirt content of the carpet or fabric:
   (a) Weigh out 2 grams of waste fiber;
   (b) Slurry in about 100 ml of ethanol for 5 minutes in a fume hood; and
   (c) Filter the solution and dry the residue.
      The difference between the dry initial and final weights can be considered to be the oil soluble dirt. There may be "dirt" that is both water and ethanol soluble. This is neglected in this analysis.

3. The determination of the polypropylene content of the carpet:
   (a) Weigh out 2 grams of waste fiber;
   (b) Slurry in 50 ml of decalin at 135° C. in a 100 ml flask fitted with a condenser in a fume hood for about 10 minutes using thermal gloves and a face shield (Semi-micro glassware is suggested); and
   (c) Filter hot, 135° C., using a suction flask.
      The loss in weight of the dried residue less the weight extracted by ethanol for the equivalent weight of carpet is the amount of polypropylene in the carpet. Note if the face yarn is polypropylene, it will be dissolved in this procedure. It is therefore important to note if the face yarn also dissolves in this procedure.

4. The determination of the amount of filler present in the latex:
   The presence of a filler in the latex can cause an error in the determination of the nylon content because the most common filler, $CaCO_3$, is soluble in formic acid. In general fillers soluble in formic acid are soluble in hydrochloric acid which is much safer and cheaper to use.

(a) Slurry about 2 grams of dry waste fiber in 100 ml of 6 normal hydrochloric acid for about 30 minutes to make sure most of the filler is extracted; and (b) Wash residue with water several times before drying the residue.

The difference in weight less the equivalent loss of weight from the water washing will be considered filler.

5. The determination of the amount of nylon 6 or nylon 6,6 present in the sample:

(a) Slurry about 2 grams of waste fiber in 50 to 100 ml of 88% formic acid, i.e., sufficient acid to completely cover the fibers using a face mask, heavy rubber gloves, rubber apron and fume hood. Formic acid is a dangerous solvent and can burn your skin and harm your lungs. Use with caution!

(b) Slurry for 10 minutes at room temperature;

(c) Filter solution using a suction flask;

(d) Wash residue at least 3 times with water; and (e) Dry the residue.

The amount of nylon face yarn present is the weight loss less the equivalent amount of material soluble in 6 normal hydrochloric acid. If there is no significant weight loss, the face yarn is either polypropylene, polyester, acrylics or natural fibers.

The above procedures assume that the face yarn is either nylon or polypropylene. If polyester, acrylics or natural fibers are present we can estimate its content from the loss of weight of the sample from the loss of material in the decalin and formic acid extractions. The amounts of polyester can be confirmed using a solvent for polyester, e.g. 60° C. meta cresol. Note that polyamides such as nylon 6 and 6,6 are also soluble in meta cresol. Polyesters are not soluble in 88% formic acid. Acrylics can be extracted with dimethyl formamide (DMF) which is a very toxic material and is particularly dangerous to pregnant women, therefore the use of a fume hood and protective gloves. It is recommended that it be used as a spot test and the amount of acrylonitrile face fiber be determined by difference when the analyst is a woman of childbearing age.

In this procedure we do no differentiate between nylon 6 and 6,6 because they result in laminates of equivalent physical properties. A simple melting point test can be used to differentiate between the two because nylon 6,6 has a melting point about 40° C. higher than nylon 6.

The present invention is illustrated but not limited to the following examples:

EXAMPLE #1

A 50 ounce per square yard nylon face yarn cut loop carpet containing 5.4 ounces of polypropylene and 23 ounces of latex and filler per square yard was spray coated with 20 weight percent of resin with respect to the face yarn content. The resin was Resi-Strand™, a resole type phenol formaldehyde resin supplied by Georgia Pacific Corporation. The laminate was cured in the press at 180° C. for 15 minutes under a pressure of 500 p.s.i. with properly sized spacers to restrict the flash of the core. The molding was cooled in the press by cold water flowing in cooling coils in both the upper and lower platens. The resulting laminate consisted of a fibrous layer in a high modulus matrix and a core layer of fused polypropylene. The original $CaCO_3$ filled styrene butadiene carpet adhesive formed a partially decomposed material that formed the core. The interface between the fibrous nylon composite and the polypropylene was not very strong and tended to debond on bending. This debonding could be seen as a constant stress value as a function of strain in a plot of the correlation of stress as a function of strain. The mechanical properties are listed in Table 3.

EXAMPLE #2

A similarly coated carpet used in example #1 was arranged in a (F-B-B-F) configuration and molded in the press at 190° C. under 500 p.s.i. for 20 minutes. The laminate was then cooled in the press. The interface between the outer fibrous composite layer and inner polypropylene layer appeared to be relatively weak. The stress strain curve showed a constant stress after an initial slope indicating the debonding was occurring at the interface. The mechanical property results are shown in Table 3. The increase in flexural modulus over example #1 is a reflection of the neutral axis now being located near the center of the laminate rather than near the surface of the face yarn in example #1.

EXAMPLE #3

A similarly coated carpet used in example #1 was pressed by a board containing a grid of 0.12 inch nails on 1 inch centers to introduce holes into the carpet. The carpet pieces were then arranged in a (F-B-B-F) configuration as in example #2. The laminate was molded in the press at 190° C. under 500 p.s.i. for 20 minutes and then cooled in the press The laminate interface was significantly stronger and the stress strain curve on bending showing little or no debonding, i.e., a fairly clean break occurred rather than a flat stress with increasing strain. A significant increase of about 60% compared to example #2 in the flexural modulus occurred as a consequence of the protrusions of the matrix resin into the polypropylene layer. The results are shown in Table 3.

EXAMPLE #4

A carpet section, the same as used in example #1 was pressed by a board containing a grid of 0.12 inch nails on ½ inch centers to introduce holes into the carpet. The carpet pieces were then arranged in a (B-F-F-B) configuration. The face yarn was coated with 20 weight percent Varcuum resin received from Oxychem. The laminate was molded in the press at 195° C. under 500 p.s.i. for 20 minutes. The laminate was then cooled in the press. Because the outer layers of a laminate essentially control the flexural modulus and polypropylene has a lower flexural modulus, it is expected that this laminate will have a lower flexural modulus than the laminate of example #3. The physical property results are listed in Table 3.

EXAMPLE #5

A waste 28 ounce level loop carpet received from the DuPont Carpet Recycling Center was used as received. The carpet was coated with 20 weight percent phenol formaldehyde resin received from Georgia Pacific Corporation. The weight percent refers only to the face yarn. The sample was arranged in a (F-B-B-F) configuration was pressed by a board containing a grid of 0.12 inch nails on ½ inch centers to introduce holes into the carpet. The laminate was molded at 195° C. under 500 p.s.i for 20 minutes and then cooled in the press. The physical property results are listed in Table 3. The use of waste carpet in an as received condition does not affect the physical properties.

EXAMPLE #6

A coated waste carpet similar to the one in example #1 was arranged in a (F-B-B-B-F) configuration. The carpet was coated with 20 weight percent phenol formaldehyde resin received from Georgia Pacific Corporation. The weight percent refers only to the face yarn. The sample was molded at 180° C. under 500 p.s.i. for 15 minutes and then cooled in the press. The interface between the outer fibrous composite layer and inner polypropylene layer appeared to be relatively weak. There was an initial flexural modulus followed by a constant stress as a function of strain indicative of debonding at the interface between the face yarn composite and the backing. The physical property results are listed in Table 3.

EXAMPLE #7

A similarly coated carpet used in example #5 was pressed by a board containing a grid of 0.12 inch nails on ½ inch centers to introduce holes into the carpet and were then arranged in a (F-B-B-F) configuration as in example #3. The carpet was coated with 20 weight percent phenol formaldehyde resin received from Oxychem type 29–353. The effective weight of the face yarn on each surface layer was then increased by adding an equivalent amount of waste cotton obtained by shredding waste socks. The waste cotton was spray coated with 20 weight percent phenol formaldehyde resin received from Oxychem. The sample was molded at 195° C. under 500 p.s.i. for 20 minutes and then cooled in the press. The thickness of the overall laminate was increase by about 20 percent. The physical properties listed in Table 3 show some improvement, a refection of the higher modulus of the cotton fibers in the outer layers. There was a sharp break on failure indicting that slippage at the interface did not occur.

EXAMPLE #8

A similarly coated carpet used in example #5 was pressed by a board containing a grid of 0.12 inch nails on ½ inch centers to introduce holes into the carpet and were then arranged in a (F-B-B-F) configuration. The carpet was coated with 20 weight percent phenol formaldehyde resin received from Georgia Pacific Corporation. The effective weight of the face yam on each surface layer was then increased by adding an equivalent weight of waste polyester (65%) cotton (35%) blend fibers obtained by shredding waste fabric from an apparel manufacturing site. The shredded fibers were spay coated with 20 weight percent phenol formaldehyde resin received from Georgia Pacific Corporation. The sample was molded at 195° C. under 500 p.s.i. for 20 minutes and then cooled in the press. The thickness of the overall laminate was increase by about 20 percent by the presence of the fabric. The physical properties listed in Table 3 show some improvement, a refection of the higher modulus of the cotton fibers. There was a sharp break on failure indicting that slippage at the interface did not occur.

EXAMPLE #9

A sample of the carpet used in example #5 was pressed by a board containing a grid of 0.12 inch nails on ½ inch centers to introduce holes into the carpet and were then arranged in a (F-B-B-F) configuration as in example 3. The carpet was coated with 20 weight percent phenol formaldehyde resin received from Oxychem. The effective weight of the face yarn on each surface layer was then slightly increased by placing a 2 mil nylon film on each carpet surface for surface improvement. The sample was molded at 195° C. under 500 p.s.i. for 20 minutes and then cooled in the press. Although an improvement surface smoothness was apparent, the physical properties were the same as example 5 and are listed in Table 3.

EXAMPLE #10

A sample of the carpet used in example #5 was pressed by a board containing a grid of 0.12 inch nails on ½ inch centers to introduce holes into the carpet and were then arranged in a (F-B-B-F) configuration as in example #3. The carpet was coated with 20 weight percent urea formaldehyde resin received from Georgia Pacific Corporation. In addition shredded waste cotton amounting to three times the weight of the face yarn was coated with 20 weight percent urea formaldehyde and formed the two outer layers. The sample was molded at 195° C. under a pressure of 500 p.s.i. for 20 minutes and then cooled in the press. Although the outer layers were thicker than the phenol formaldehyde examples, the mechanical properties are poorer than Examples #7 and #8. The properties are listed in Table 3

EXAMPLE #11

A waste 28 ounce per square yard level loop carpet received from the DuPont Carpet Recycling Center and was used as received. The carpet was pressed by a board containing a grid of 0.12 inch nails on ½ inch centers to introduce holes into the carpet The carpet was coated with 20 weight percent phenol formaldehyde resin Varcum 29353 made by Oxychem Corporation. The weight percent refers only to the face yarn. To the face yarn shredded cotton polyester waste, 60/40, fabric, equivalent in weight to the face yarn of the carpet, coated with 20 weight percent Varccum 29353 phenol formaldehyde was added to each surface. The sample was molded at 195° C. under a pressure of 500 p.s.i. for 20 minutes and then cooled in the press. The properties are listed in Table 3. The much higher flexural properties is a reflection of both a higher modulus of the cured adhesive coating, the thickness of the outer layers of the laminate compared to the core and the higher overall modulus of the outer layer.

EXAMPLE #12

A shredded waste carpet, having the same overall weight of the 28 level loop carpet used as the inner layers of example #11, was used as received. The shredded waste carpet was coated with 20 weight percent phenol formaldehyde resin Varcum 29353 made by Oxychem Corporation to form the inner core of the laminate. The equivalent of 28 ounces per square yard of shredded cotton polyester waste, 60/40, fabric coated with 20 weight percent Varccum 29353 phenol formaldehyde was added to each surface of the shredded carpet core. The sample was molded at 195° C. under a pressure of 500 p.s.i. for 20 minutes and then cooled in the press. The properties are listed in Table 3. No slippage of the interface between the core and the outer layers of the laminate occurred.

EXAMPLE #13

A shredded waste carpet, having the same overall weight of the 28 level loop carpet used as the inner layers of example #12, was used as received. The shredded waste carpet was coated with 20 weight percent phenol formaldehyde resin Varcum 29353 made by Oxychem Corporation. The equivalent of 28 ounces per square yard of shredded cotton waste coated with 20 weight percent Varccum 29353 phenol formaldehyde was added to each surface of the shredded carpet core. The sample was molded at 195° C. under a pressure of 500 p.s.i. for 20 minutes and then cooled in the press. The properties are listed in Table 3. The less effective thickness of the outer layers of the laminate compared to example #12 reduced the flexural properties of the laminate.

EXAMPLE #14

A shredded waste carpet, having the same overall weight of the 28 level loop carpet used as the inner layers of example #12, was used as received. The shredded waste carpet was coated with 15 weight percent phenol formaldehyde resin Varcum 29353 made by Oxychem Corporation. The equivalent of 84 ounces per square yard of shredded cotton waste coated with 25 weight percent Varccum 29353 phenol formaldehyde was added to each surface of the shredded carpet core. The sample was molded at 195° C. under a pressure of 500 p.s.i. for 20 minutes and then cooled in the press. The properties are listed in Table 3. The increased thickness of the outer layers of the laminate increased the flexural properties compared to example #14.

EXAMPLE #15

A shredded waste carpet, having the same overall weight of the 28 ounce per square yard level loop carpet used as the inner layers of example #12, was used as received. The shredded waste carpet was coated with 15 weight percent phenol formaldehyde resin Varcum 29353 made by Oxychem Corporation to form the inner core of the laminate. The equivalent of 56 ounces per square yard of fabric bits coated with 25 weight percent Varccum 29353 phenol formaldehyde was added to each surface of the shredded carpet core. The sample was molded at 195° C. under a pressure of 500 p.s.i. for 20 minutes and then cooled in the press. The properties are listed in Table 3.

EXAMPLE #16

To a shredded waste carpet, having the same overall weight of the 28 ounce per square yard level loop carpet used as the inner layers of example 12, an equivalent weight of shredded waste cotton socks equal to 84 ounces per square was added as outer layers. The blend was coated with 20 weight percent weight bisphenol A formaldehyde powered resin made by Oxychem Corporation. To the core an equivalent amount of shredded waste socks, equivalent to 28 ounces per square yard, and coated with 20 weight percent Varccum 29353 phenol formaldehyde. The sample was molded at 195° C. under a pressure of 500 p.s.i. for 30 minutes and then cooled in the press. The properties are listed in Table 3.

TABLE 3

| Ex. # | Description | Tensile Strength | Tensile Modulus | Tensile Strain | Flex Strength | Flex Modulus | Flex Strain |
|---|---|---|---|---|---|---|---|
| 1 | 50 wt carpet, new | 1,229 | 17,181 | 0.062 | 1,941 | 66,837 | 0.06 |
| 2 | 2 × 50 wt carpets, new (F-B-B-F) | 1,200 | 34,000 | 0.022 | 4,200 | 126,000 | 0.058 |
| 3 | 2 × 50 wt carpets, new (F-B-B-F): 1" holes | 1,400 | 24,000 | 0.030 | 4,300 | 205,000 | 0.036 |
| 4 | 2 × 50 wt carpets, new (B-F-F-B): 0.5" holes | 900 | 11,000 | 0.149 | 1,000 | 47,000 | 0.064 |
| 5 | 2 × 28 wt carpets, used (F-B-B-F): 0.5" holes | 1,200 | 31,000 | 0.029 | 3,700 | 233,000 | 0.042 |
| 6 | 2 × 50 wt carpets, new (F-B-B-B-F) | 1,700 | 35,000 | 0.035 | 4,200 | 152,000 | 0.057 |
| 7 | 2 × 28 wt carpets, used (F-B-B-F) & shredded cotton: 0.5" holes | 1,400 | 54,000 | 0.020 | 3,700 | 328,000 | 0.021 |
| 8 | 2 × 28 wt carpets, used (F-B-B-F) & shredded fabric: 0.5" holes | | | | 5,100 | 380,000 | 0.023 |
| 9 | 2 × 28 wt carpets, used (F-B-B-F) & thin nylon film: 0.5" holes | 1,900 | 37,000 | 0.023 | 4,400 | 223,000 | 0.029 |
| 10 | 2 × 28 wt carpets, used (F-B-B-F) & shredded cotton (3× wt): Urea Form. | 2,000 | 69,000 | 0.022 | 2,000 | 112,000 | 0.033 |
| 11 | 2 × 28 wt carpets, used (F-B-B-F) & shredded fabric: 0.5" holes | | | | 11,000 | 893,000 | 0.020 |
| 12 | Shredded carpet & shredded fabric | 2,500 | 71,000 | 0.013 | 5,400 | 577,000 | 0.016 |
| 13 | Shredded carpet & shredded sock | | | | | | |
| 14 | 2 × 28 wt carpets, used (F-B-B-F) & shredded cotton (3× wt): 0.5" holes | 5,920 | 149,000 | 0.028 | 9,600 | 789,000 | 0.02 |
| 15 | 2 × 28 wt carpets, used F-B-B-F) & .5 × .5" fabric squares: 0.5" holes | 4,600 | 143,000 | 0.026 | 7,800 | 724,000 | 0.02 |
| 16 | Shredded carpet & shredded cotton (3× wt): Bisphenol | | | | 8,200 | 593,000 | 0.02 |

What is claimed is:

1. A process for making a laminate from carpet, wherein the laminate comprises at least two carpet backing layers and at least two layers of unmelted synthetic or natural face yarn fibers coated with a cured resin matrix adhesive, said process comprising:

a) coating yarn fibers including face yarn fibers of at least two pieces of carpet with a low viscosity adhesive which is curable under elevated temperature and pressure to a cured resin matrix adhesive, wherein said pieces of carpet each comprise a face yarn and a backing, the face yarn containing unmelted synthetic or natural fibers;

b) positioning said at least two pieces of carpet in proximity to each other to form a laminate in which adjacent pieces are in a face-to-face or back-to-back orientation but not in a face-to-back orientation; and c) curing the adhesive thereby obtaining a laminate comprising at least two carpet backing layers and at least two fibrous layers, each comprising unmelted synthetic or natural yarn fibers in a matrix of cured resin adhesive.

2. The process of claim 1 wherein said carpet pieces are unshredded waste carpet pieces and said fibers additionally include fibers of shredded waste carpets.

3. The process of claim 1 wherein two carpet pieces are placed back-to-back and the resulting laminate contains two outer fibrous layers that contain said unmelted fibers in said matrix of cured resin adhesive.

4. The process of claim 1 wherein two carpet pieces are placed face-to-face and the resulting laminate contains two outer backing layers.

5. The process of claim 1 wherein at least two pieces of carpet are positioned so that an uncured laminate is arranged in a pattern, selected from the group consisting of (F-B-B-

F), (F-B-(B)$_n$-B -F), (F-B-(B-F-F-B)$_n$-B-F) and (F-B-(B-F-F-B)$_n$) where F and B refer to the face yarn and backing layer respectively, and n is zero or a positive integer.

6. The process of claim 1 wherein at least two pieces of carpet are positioned so that an uncured laminate is arranged in a pattern, selected from the group consisting of (B-F-F-B), (B-F-(F). -F -B)$_n$(B-F-(F-B-B-F)$_n$-F-B) and (B-F-(F-B-B-F)$_n$) where F and B refer to the face yarn and backing layer respectively, and n is zero or a positive integer.

7. The process of claim 1 wherein said adhesive is cured at elevated temperature and pressure.

8. The process of claim 7 wherein said elevated temperature and said applied elevated pressure are obtained by molding.

9. The process of claim 1 wherein the cured adhesive is a high modulus matrix adhesive.

10. The process of claim 9 wherein the resulting laminate is a wood substitute.

11. A laminate from carpet, comprising:
   a) a plurality of layers including a plurality of face yarn layers comprising unmelted fibers and a plurality of carpet backing layers; and
   b) a low viscosity uncured adhesive coating said fibers; wherein
      (1) said laminate includes at least two pieces of carpet, each of which has a backing layer and a face yarn layer comprising coated unmelted fibers;
      (2) said pieces of carpet are positioned so that adjacent pieces are in a face-to-face or back-to-back orientation but not a face-to-back orientation; and
      (3) said low viscosity adhesive is curable to a cured resin matrix adhesive.

12. The laminate of claim 11 wherein said plurality of layers are arranged in a pattern selected from the group consisting of (F-B-B-F), (F-B-(B)$_n$-B-F), (F-B-(B-F-F-B)$_n$-B-F) and (F-B-(B-F-F-B)$_n$) where F and B refer to the face yarn and backing layer respectively, and n is zero or a positive integer.

13. The laminate of claim 11 wherein said plurality of layers are arranged in a pattern selected from the group consisting of (B-F-F-B), (B-F-(F)$_n$-F-B), (B-F-(F-B-B-F)$_n$-F-B) and (B-F-(F-B-B-F)$_n$) where F and B refer to the face yarn and backing layer respectively, and n is zero or a positive integer.

14. The cured laminate resulting from curing the laminate of claim 11.

15. The cured laminate of claim 14 where the cured adhesive is a high modulus matrix adhesive.

16. The process of claim 1 which further comprises the step of making a plurality of holes in at least one of the at least two pieces of carpet to permit the adhesive to flow through at least a portion of the holes thereby making an anchor point between the face yarn and the backing.

17. The process of claim 16 wherein a backing of each carpet is adjacent to each other.

18. The process of claim 16 wherein a face yarn of each carpet is adjacent to each other.

19. The process of claim 1 wherein the temperature is from 110° C. to below the melting point of the face yarn inclusive and the pressure is from 100 to 1,000 psi inclusive.

20. The process of claim 19 wherein the temperature is from 110 to 205° C. inclusive.

21. The process of claim 1 wherein an adhesive coating weight of the face yarn is from 5 to 70 weight percent inclusive.

22. The process of claim 21 wherein an adhesive coating weight of the face yarn is from 10 to 50 weight percent inclusive.

23. The process of claim 22 wherein the adhesive coating weight of the face yarn is from 20 to 35 weight percent inclusive.

24. The process of claim 1 wherein the adhesive is selected from the group consisting of phenol-formaldehyde resins, urea-formaldehyde resins, melamine urea formaldehyde resins, tannin-phenol-formaldehyde resins, diisocyanate resins, epoxy resins, crosslinkable polyvinyl acetate resins, protein type resins and polyester resins.

25. The process of claim 1 which further comprises the step of reducing a molding pressure during the step of curing to allow for the release of volatiles.

26. The process of claim 1 wherein the backing is melt incompatible with the face yarn.

27. The process of claim 1 wherein a time for the step of curing is at least sufficient to fuse the backing layers.

28. The process of claim 18 wherein the backing layers comprise polypropylene and the pressure is from 300 to 600 psi inclusive and the temperature is from 170 to 200° C. inclusive.

29. The process of claim 1 which further comprises the step of adding a reinforcing agent selected from the group consisting of shredded fabric, shredded fibers, shredded knits, shredded plastic films and shredded plastics.

30. The process of claim 29 wherein the reinforcing agent is other than those of the backing.

31. The process of claim 5 wherein the adhesive is selected from the group consisting of phenol-formaldehyde resins, urea-formaldehyde resins, melamine urea formaldehyde resins, tannin-phenol-formaldehyde resins, diisocyanate resins, epoxy resins, crosslinkable polyvinyl acetate resins, protein type resins and polyester resins.

32. The process of claim 5 wherein n is at least 1 and the adhesive coated onto the face layer is not the same for each face layer.

33. The process of claim 6 wherein the adhesive is selected from the group consisting of phenol-formaldehyde resins, urea-formaldehyde resins, melamine urea formaldehyde resins, tannin-phenol-formaldehyde resins, diisocyanate resins, epoxy resins, crosslinkable polyvinyl acetate resins, protein type resins and polyester resins.

34. The process of claim 6 wherein n is at least 1 and the adhesive coated onto the face layer is not the same for each face layer.

35. The laminate of claim 12 which further comprises a plurality of holes in at least one of the face yarn and the backing to permit the adhesive to flow through at least a portion of the holes thereby making an anchor point between at least one face yarn and the backing.

36. The laminate of claim 12 which further comprises a reinforcing agent selected from the group consisting of shredded fabric, shredded fiber, shredded knit, shredded plastic film and shredded plastic.

37. The laminate of claim 36 wherein the reinforcing agent is other than those of the backing.

38. The laminate of claim 13 which further comprises a plurality of holes.

39. The laminate of claim 38 which further comprises a reinforcing agent selected from the group consisting of shredded fabric, shredded fiber, shredded knit, shredded plastic film and shredded plastic.

40. The laminate of claim 39 wherein the reinforcing agent is other than those of the backing.

* * * * *

UNITED STATES PATENT AND TRADEMARK OFFICE
CERTIFICATE OF CORRECTION

PATENT NO.: 5,912,062

DATED: June 15, 1999

INVENTOR(S): Kotliar et al.

It is certified that error appears in the above-indentified patent and that said Letters Patent is hereby corrected as shown below:

In claim 6, line 7 delete "$(B-F-(F).-F-B)_n$," and replace with --$(B-F-(F)_n-F-B)$,--.

In claim 38, after "holes", insert --in at least one of the face yarn and the backing to permit the adhesive to flow through at least a portion of the holes thereby making an anchor point between at least one face yarn and the backing--.

Signed and Sealed this

Twenty-sixth Day of October, 1999

*Attest:*

Q. TODD DICKINSON

*Attesting Officer*   *Acting Commissioner of Patents and Trademarks*